(12) United States Patent
Ambrosi (10) Patent No.: US 12,246,917 B2
(45) Date of Patent: Mar. 11, 2025

(54) LOGISTIC SYSTEM FOR MANAGING AND DISPLACING MATERIALS IN VERTICAL MODULAR SHELVES AND VERTICAL MODULAR FARMS

(71) Applicant: ONO EXPONENTIAL FARMING S.R.L., San Giovanni Lupatoto (IT)

(72) Inventor: Thomas Ambrosi, San Giovanni Lupatoto (IT)

(73) Assignee: ONO EXPONENTIAL FARMING S.R.L., San Giovanni Lupatoto (IT)

( * ) Notice: Subject to any disclaimer, the term of this patent is extended or adjusted under 35 U.S.C. 154(b) by 280 days.

(21) Appl. No.: 18/022,011

(22) PCT Filed: Aug. 10, 2021

(86) PCT No.: PCT/IB2021/057358
§ 371 (c)(1),
(2) Date: Feb. 17, 2023

(87) PCT Pub. No.: WO2022/038459
PCT Pub. Date: Feb. 24, 2022

(65) Prior Publication Data
US 2023/0271777 A1 Aug. 31, 2023

(30) Foreign Application Priority Data
Aug. 21, 2020 (IT) ........................ 102020000020323

(51) Int. Cl.
*B65G 1/04* (2006.01)
*A01G 9/14* (2006.01)
*A01G 31/06* (2006.01)

(52) U.S. Cl.
CPC ........... *B65G 1/0407* (2013.01); *A01G 9/143* (2013.01); *A01G 31/06* (2013.01); *B65G 1/0414* (2013.01)

(58) Field of Classification Search
CPC .. B65G 1/0435; B65G 1/0414; B65G 1/0492; B65G 1/0442; B65G 1/0428; A01G 9/143; A01G 31/06
See application file for complete search history.

(56) References Cited

U.S. PATENT DOCUMENTS

2020/0122923 A1* 4/2020 Moulin ................ B65G 1/0435
2020/0180863 A1* 6/2020 Moulin ................ B65G 1/0492
(Continued)

FOREIGN PATENT DOCUMENTS

EP          1348646 A2    10/2003
WO       2009118100 A1    10/2009
WO    WO-2018142241 A1 *  8/2018  ............... B65G 1/04

OTHER PUBLICATIONS

Written Opinion of the International Searching Authority issued for PCT/IB2021/057358, date of mailing Nov. 9, 2021.
(Continued)

*Primary Examiner* — Kaitlin S Joerger
(74) *Attorney, Agent, or Firm* — ArentFox Schiff LLP (57) ABSTRACT

A logistic system for managing and displacing materials comprises a first series of shelves (23) and a second series of shelves (24); the first series of shelves (23) is arranged in front of the second series of shelves (24), and a central aisle (25) is obtained between the shelves; each shelf is made up of a first pair of uprights (21, 22) facing towards the central aisle and a second pair of uprights (26, 27) facing towards the opposite side. The uprights of each shelf are retained by structural cross members. At the lower portion thereof, the uprights have a recess (35) which enables a carriage (20) equipped with toothed wheels (31) to pass the shelves during the sliding on the ground. The carriage is provided with a lifting system (36), activated by motor organs located inside the carriage (20).

11 Claims, 5 Drawing Sheets

(56) References Cited

U.S. PATENT DOCUMENTS

| | | | |
|---|---|---|---|
| 2022/0048709 A1* | 2/2022 | Valinsky | B65G 1/0464 |
| 2022/0388775 A1* | 12/2022 | Baulard | B65G 1/065 |
| 2023/0286762 A1* | 9/2023 | Bangalore Srinivas | |
| | | | B65G 1/0485 |
| 2023/0365335 A1* | 11/2023 | Ramankutty | B65G 1/0471 |
| 2024/0025645 A1* | 1/2024 | Moulin | B65G 1/0478 |
| 2024/0116707 A1* | 4/2024 | Chang | B66F 9/141 |
| 2024/0336436 A1* | 10/2024 | Lerouge | B61C 11/02 |

OTHER PUBLICATIONS

International Search Report issued for PCT/IB2021/057358, date of mailing Nov. 9, 2021.

* cited by examiner

LOGISTIC SYSTEM FOR MANAGING AND DISPLACING MATERIALS IN VERTICAL MODULAR SHELVES AND VERTICAL MODULAR FARMS

CROSS-REFERENCE TO RELATED APPLICATIONS

This application is the U.S. National Stage Application of International Patent Application No. PCT/IB2021/057358, filed on Aug. 10, 2021, which claims priority to Italian Patent Application No. 102020000020323, filed on Aug. 21, 2020, the contents of each of which is incorporated herein by reference in its entirety.

FIELD OF APPLICATION

The present invention relates to a logistic system for managing and displacing materials of vertical modular shelves for industrial use or components used for cultivating plants treated inside modular structures for hydroponic cultivations or other similar cultivations under automatic and modular management generally having a vertical extension.

The present invention is described below with reference to a hydroponic system, which however does not exclude other methods of soilless farming, or other storage systems of components, also industrial, which can be mentioned specifically at the time of differentiation in relation to the construction techniques which can be adopted.

The present invention is advantageously applied in the field of management systems of modular warehouses of industrial components or in that of vertical farms used for hydroponic, aeroponic and aquaponic cultivation or other similar structures.

PRIOR ART

It is known that so-called "vertical farms" are being used more and more and are in continuous growth, i.e., those cultivations with a substantially vertical structure based on hydroponic technology, better known in recent years, whose prerogative is to allow the development of cultivations of plants in particular conditions.

The vertical cultivation system is based on the use of trays which contain growing plants, positioned on several floors or levels, allowing a vertical development of the cultivations, which contain the plants to be developed positioned on structures similar to those used in warehouses for the storage of goods in logistics centres.

Such structures are generally composed of four uprights which allow the positioning of a plurality of shelves adapted to form, together with the columns, modular structures having a substantially parallelepiped shape.

Such modular structures contain equipment suitable for the containment and development of the plants inserted in said trays placed on the shelves, i.e., irrigation, lighting, ventilation and air conditioning systems and systems for the movement of the trays inside the structure or towards the so-called loading/unloading "bays".

The problem encountered with the use of the traditional containment structures with a vertical extension consists of the difficult management of the plants or other elements or components located in the trays arranged on various levels, in particular those of the higher levels, which in order to be reached require the use of ladders or, for the mechanisation of the system, in some cases self-propelled means are also used, such as trucks or fork lift trucks.

The use of such equipment has highlighted the problematic management of the cultivations placed at the higher levels, as the mechanised systems also do not allow the direct control and management of the cultivations.

Furthermore, for cultivations with a vertical extension performed inside closed environments, the column elements often used are subject to height restrictions determined by the height of the floors inside the buildings in which the cultivations are created. The lack of modularity of the known systems does not permit flexible solutions and it is often necessary to demolish floors inside buildings for the purpose of positioning column elements in determined positions.

Automatic and modular management systems for trays used for the containment of plants or the like or warehouses for the containment of industrial components are also known in the art, comprising a plurality of modules with a quadrangular plan and vertical alignment delimited by respective vertical supports, comprising a plurality of substantially horizontal and overlapped seats or guides for trays, as well as a central area in which a vertical tray transfer device operates, slidable along a vertical axis arranged on movement means activated by motorisation units capable of translating said vertical transfer device from a lowered position to a raised position to move at each tray and vice versa.

In this case, the vertical transfer device is provided with a support shelf for a tray and first means adapted to translate said tray along a first horizontal axis to and from a respective seat provided inside one of said lateral zones.

This solution provides that said first module further comprises a second means arranged in said central zone in which said elevator device operates, adapted to take in charge a tray when the latter is located on the shelf of said elevator device and to displace said tray along a second axis horizontal and orthogonal to said first horizontal axis for performing the direct transfer of said tray towards a further shelf of a further vertical transfer device of a second module arranged adjacent and connected to said first module.

Even this solution, although extremely valid and decisive for the exchange between different modules side by side, suffers from the fact that each module can be intercepted by a single elevator, while it would be desirable for each module to be affected by several elevators each of which is capable of displacement between multiple modules.

Finally, solutions are known in the field which involve the use of automated guided carriages which can be detached from the modular structures and which can also hook thereto to ascend and descend after having displaced between one module and the other.

In this case, it is provided that the automated guided carriage can be associated with two pairs of uprights, each fixed to two separate shelves which delimit an aisle of circulation, where said carriage is equipped with at least two sliding wheels, destined to pick up objects from at least one of said shelves, and motorised ascent means capable of cooperating with said uprights so as to allow said carriage to ascend along said uprights.

Said ascent carriage is made up of a frame equipped with four toothed wheels with substantially parallel axes, each destined to cooperate with one of said four uprights, with the axes of the toothed wheels substantially orthogonal to the axes of the sliding wheels, each of the toothed wheels being mounted on a movable support with respect to the frame of said carriage so as to move between two positions:

a position extended outside the carriage in which at least one part of said toothed wheel mounted on said support projects laterally from the frame;

a retracted position, in which the gear mounted on said support faces said frame.

This solution provides for the use of a roller chain fixed and stretched on each of said uprights, which chain extends substantially parallel to the longitudinal axis of the upright to which it is fixed and is destined to receive at least one tooth of the pinion cooperating with the upright to which it is fixed, two adjacent rollers of said chain being substantially spaced by the pitch of said pinion.

Furthermore, this solution provides that each movable support is equipped with means for fixing to one of said four uprights configured so as to allow the maintenance of a determined spacing between the axis of the toothed wheel mounted on said movable support and the chain which receives the teeth of the same toothed wheel.

This solution also presents problems related to the complexity of the mechanical construction of the carriage and the difficult application of the roller chain on the respective upright.

In fact, as far as the first aspect is concerned, it should be noted that each of the four pinions is mounted on a slide associated with means for moving such a slide which allow the pinions to move from a retracted position inside the carriage to free themselves from said chain during the translation steps of the carriage from one module to another, to a position extended outside to engage with said chains during the steps of ascent and descent with respect to the uprights themselves.

As far as the second aspect is concerned, the roller chain is difficult to apply on the respective uprights, with the necessary use of special brackets or by means of complex and expensive welding points.

In both cases, the intervention of specialised personnel is necessary, which must be used to perform such rather complex operations, as they are very repetitive.

Similar solutions involve the use of racks which replace the roller chains fixed and stretched on each of said uprights, which however are subject to similar problems with respect to those highlighted above.

Document WO 2009/118100 A1 describes an automated system for picking and moving goods in warehouses, comprising a carriage with horizontal movement devices and capable of moving autonomously. The carriage has goods movement devices adapted to allow goods to be picked up and then repositioned in the warehouse. The system further has guide means fixed to a structure inside said warehouse. The guide means are adapted to guide the vertical movement of the goods movement devices.

DESCRIPTION OF THE INVENTION

The present invention aims to develop the possibility of obtaining a new logistic system for managing and displacing materials of vertical modular warehouses for industrial use or components used for cultivating plants treated inside modular structures for hydroponic cultivations, so as to solve or at least significantly reduce the aforementioned drawbacks.

In fact, one of the objects of the invention is to provide a logistic system for managing modular warehouses or vertical farms which comprises a series of autonomous movement carriages for the translation along horizontal lines and the ascent on the respective four uprights, each carriage being made up of a frame equipped with four toothed wheels with substantially parallel axes, each destined to cooperate with one of said four uprights, with the axes of the toothed wheels substantially orthogonal to the axes of the sliding wheels.

According to the invention, it is provided that each of the toothed wheels is mounted on a fixed frame and is capable of engaging in respective special seats of the uprights obtained from cuts or recesses with a constant pitch directly on the same opposite uprights inside the aisle defined by the two opposite modular structures.

According to the invention, it is provided that the cuts representing the seats intercepted by the toothed wheels remain raised for a certain portion with respect to the support surface, i.e., recessed seats are obtained in the lower part of the uprights which are adapted to allow the sliding of the carriage on the plane between the uprights, preventing the projecting toothed wheels from coming into contact therewith.

It is also provided that, for the engagement of the toothed wheels on the respective uprights, the carriage is equipped with a lifting device which determines the movement of the carriage upwards until the first engagement cut in the upright is reached.

According to the invention, all this greatly simplifies the construction of both the uprights and the carriage, with all the advantages which derive from both the production viewpoint and from that of the use and management of the system.

ILLUSTRATION OF THE DRAWINGS

Further features and advantages of the invention will become apparent from reading the following description of an embodiment of the invention provided by way of non-limiting example, with the aid of the figures illustrated in the appended tables of drawings, in which.

DESCRIPTION OF AN EMBODIMENT OF THE INVENTION

Figure 5:
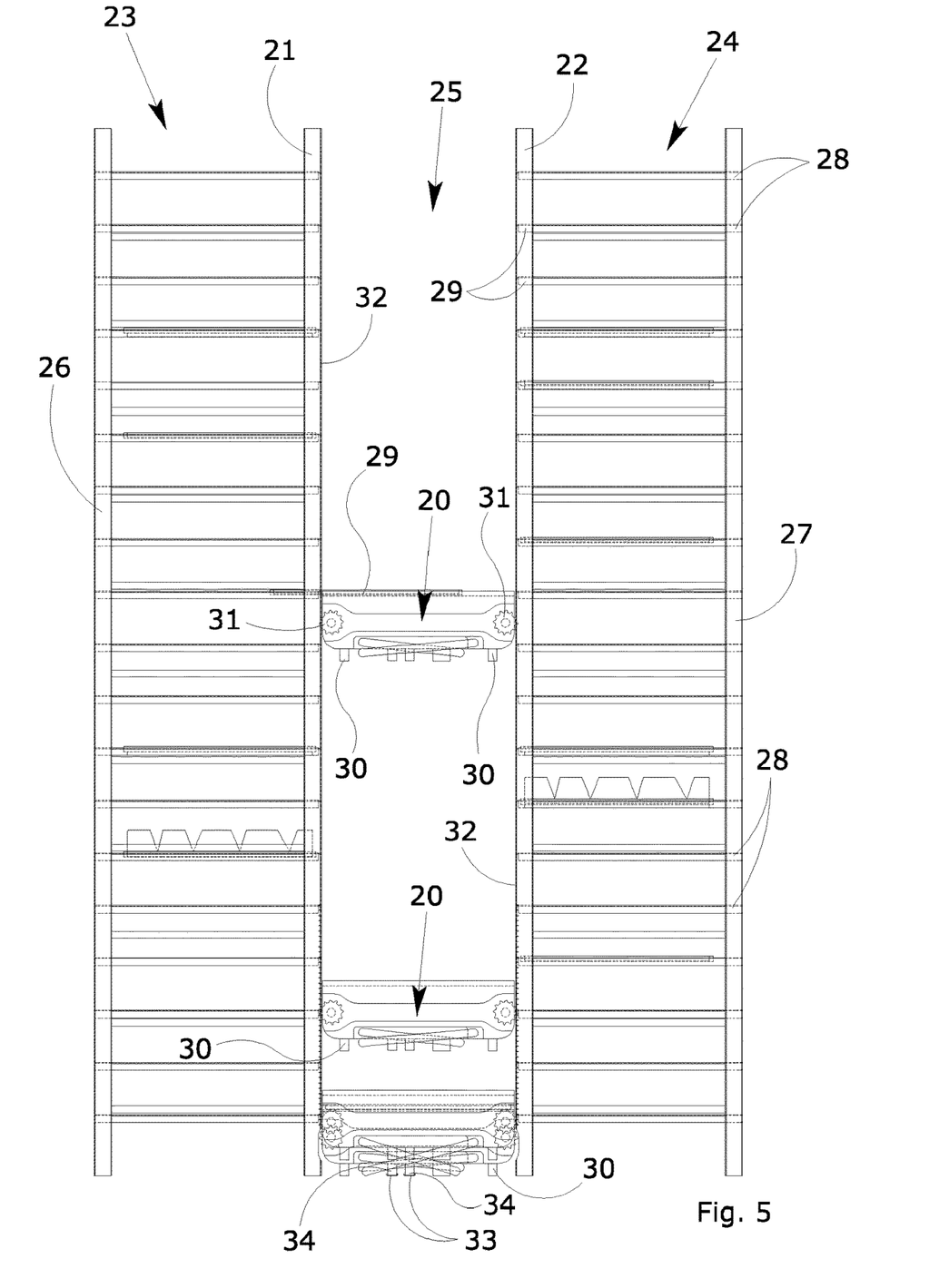
FIG. 5 shows a front view of two modular elements between which the automatic management carriages act according to the invention.
Figure 6:
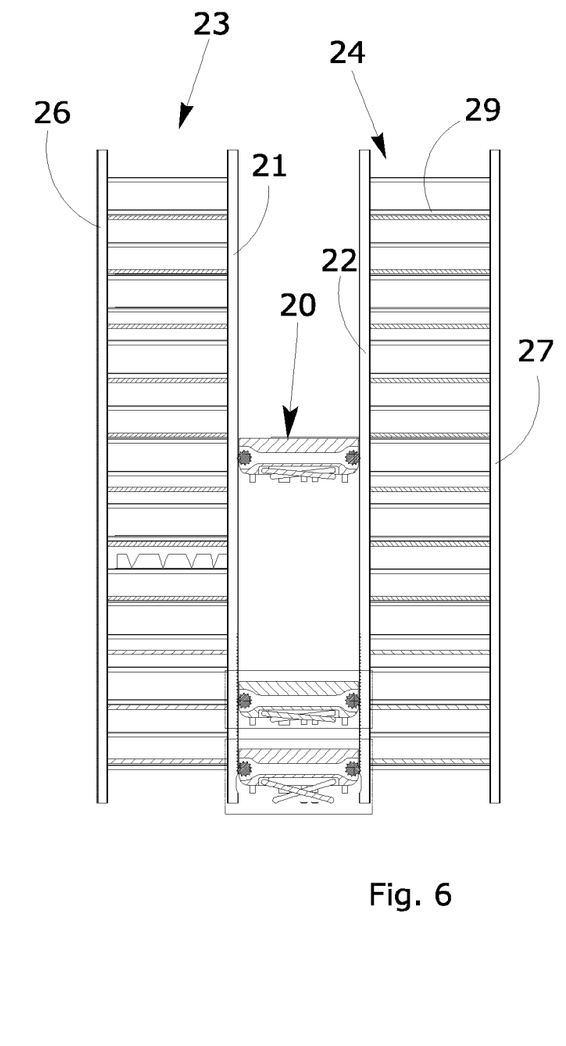
FIGS. 6 and 7 depict front schematic views of the modular elements in two different possible operating situations.
Figure 7:
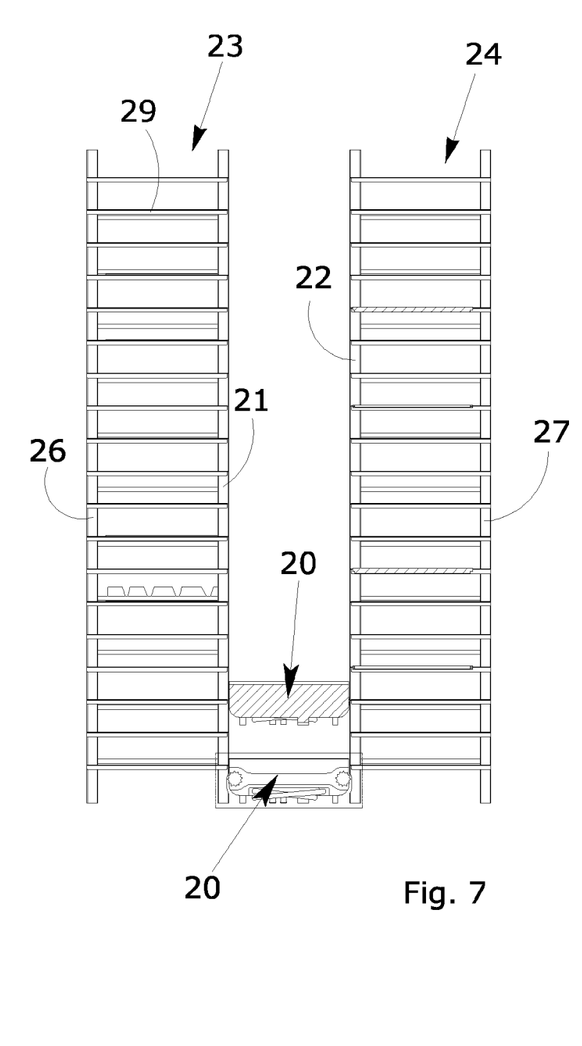

Referring to the appended figures, and initially in particular to FIG. 5, the number 20 generally refers to an automated guided carriage according to the invention, which can be associated with two pairs of uprights 21 and 22, each of which is fixed to two separate modular shelves 23 and 24 which delimit a central aisle of circulation 25.

According to the embodiment depicted in FIG. 5, the other two pairs of uprights 26 and 27, opposite and facing outwards with respect to the uprights 21 and 22 of each modular shelf 23 and 24 form a structure in which series of supports or shelves 28 are arranged towards the inside of the pairs of uprights, so as to be able to make up opposite supports to support a plurality of trays 29, containing the articles or products which will be positioned thereon and which can be extracted/inserted for the management or movement thereof.

All the uprights 21, 22, 26 and 27 are made of metal tubular elements of quadrilateral section, for the purposes that we will describe later.

Said automated guided carriage 20 is equipped with a traditional wheel or belt movement system projecting from the upper side, destined to pick up and/or reposition said trays 29 from/towards at least one of said series of supports or racks 28, at least in a direction orthogonal to the translation line on the ground of said carriages.

According to the embodiment still depicted in FIG. 5, the carriage 20 is equipped with "ground" horizontal displacement means for the movement thereof from one modular structure to the other and motorised ascent means capable of cooperating with said uprights 21 and 22 so as to allow said carriage to ascend and descend to move to the level of the trays to be moved to the translation level on the ground.

More specifically, said carriage 20 is made up of a substantially quadrilateral frame equipped with four sliding wheels 30 for the movement thereof on the ground, with axes substantially parallel and orthogonal with respect to the advancement direction on the ground between one module and the other.

Furthermore, said motorised ascent means capable of cooperating with said uprights 21 and 22 so as to allow said carriage to rise and descend to move to the level of the trays to be moved is represented by toothed wheels 31 with the axes substantially orthogonal to the axes of said sliding wheels 30 and parallel to the advancement direction on the ground.

Figure 1:
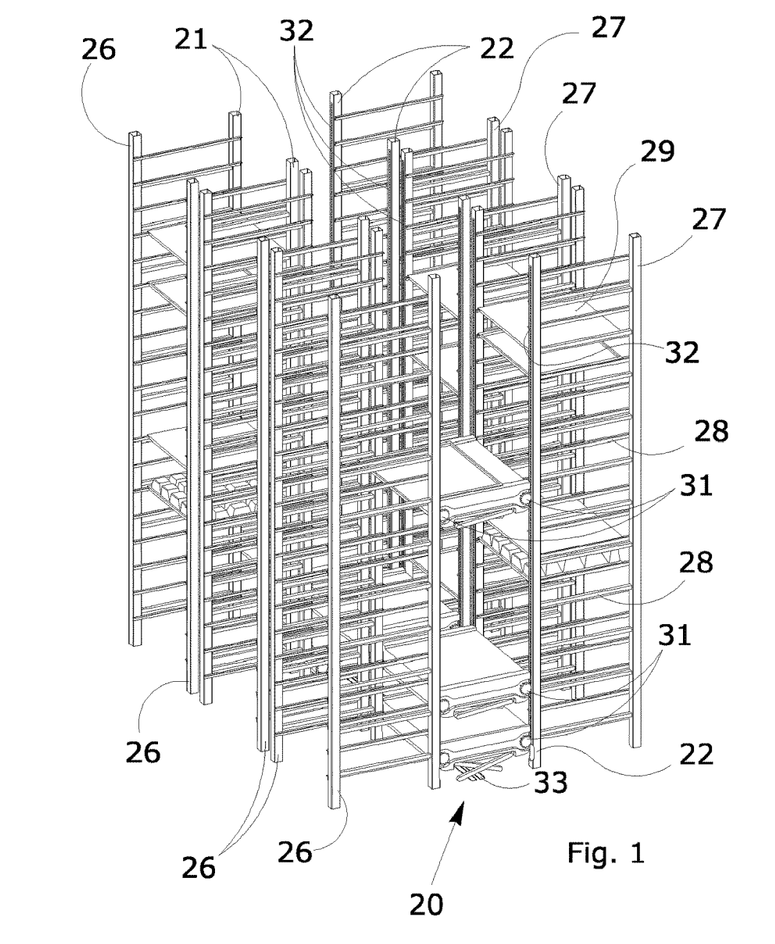
FIG. 1 schematically depicts and in an axonometric perspective partially from the top, a view of a series of modular elements intercepted by the management carriages of the system according to the invention.
Figure 2:
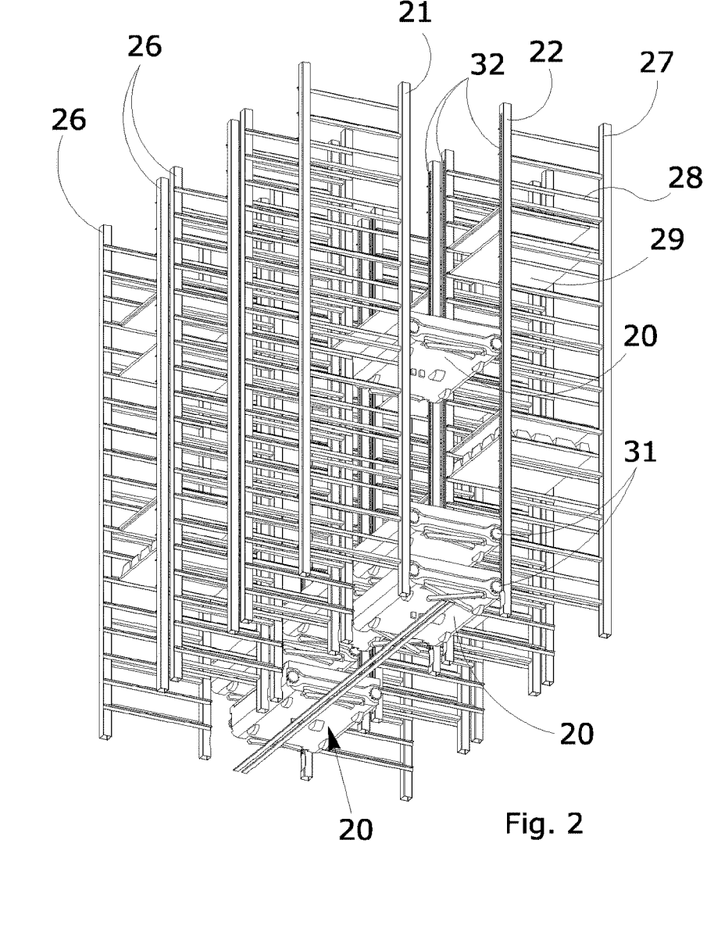
FIG. 2 illustrates schematically and in an axonometric perspective partially from below, a view of a series of modular elements intercepted by the management carriages of the system according to the invention.
Figure 3:
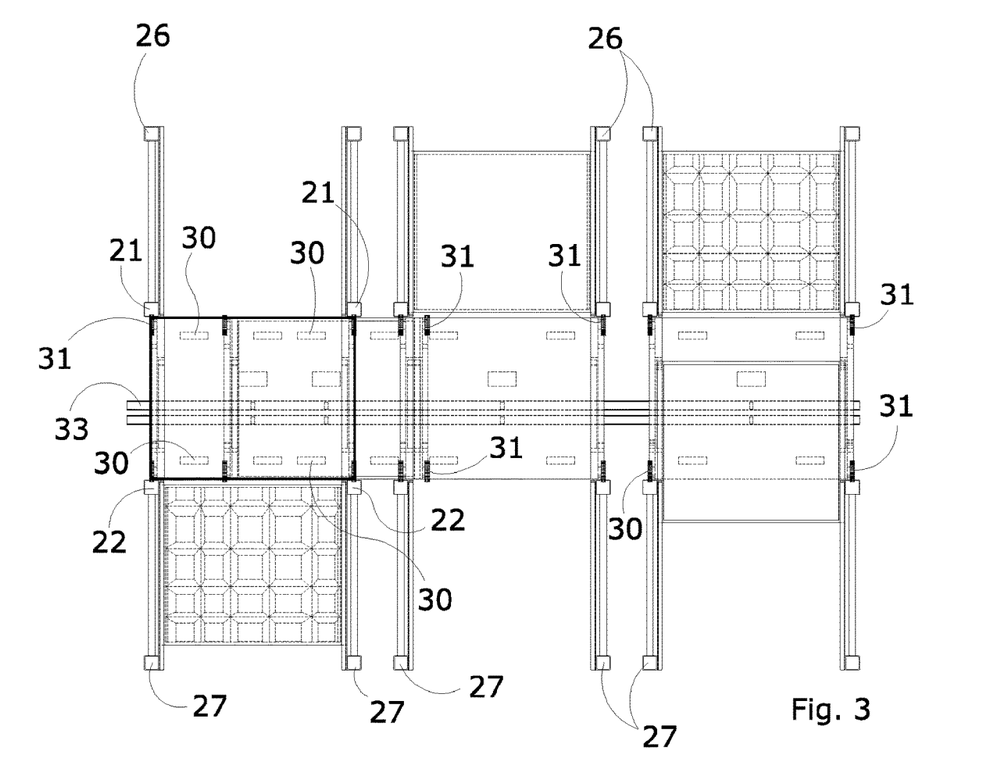
FIG. 3 depicts a plan view of the management system according to the invention.
Figure 4:
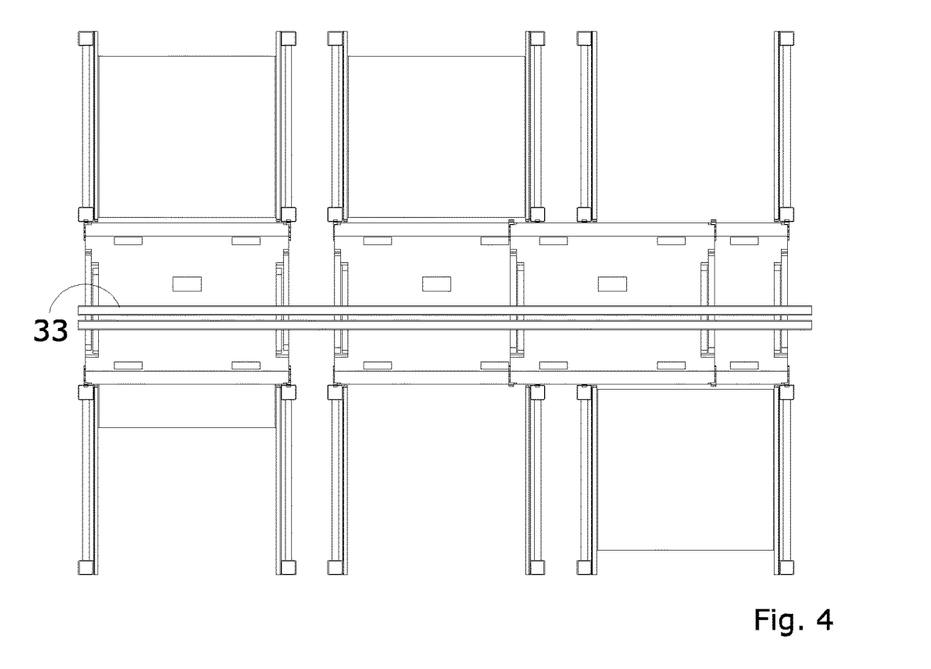
FIG. 4 illustrates a view of the management system according to a dimension from below.

According to the embodiment shown in FIGS. 1, 2 and 5, each of said toothed wheels 31 is destined to cooperate with one of said four uprights 21 and 22, since the latter, which are, as mentioned, made of metal tubular elements having a quadrilateral section, are equipped with toothed racks obtained from cuts or recesses 32 of a constant pitch made directly on the opposite uprights inside the aisle defined by the two opposite modular structures.

The pitch of the cuts or recesses 32 of the uprights corresponds to the pitch of the teeth of the toothed wheels 31.

Both the four sliding wheels 30 for displacing the carriage on the ground, and the toothed wheels 31 for raising/lowering the carriage on the respective uprights, are connected to respective motorising means.

More precisely, the carriages 20 move longitudinally along the ridge consisting of series of pairs of opposite shelves aligned with each other to also cover large surfaces and it is provided that the movement on the ground occurs by means of said motorised wheels 30 activated by motors positioned inside the casing of the carriage. In the case of only one or two motorised wheels, other balancing wheels can be provided, arranged so as to keep the position of the carriage stable during the longitudinal displacements on the ground.

According to a further embodiment, in order to ensure the maximum precision of the movements of the carriage, the sliding thereof is provided in a guided manner inside tracks associated with respective shoes or auxiliary wheels mounted on the lower part of the carriage itself.

By sliding longitudinally between the modular structures, the carriages 20 can stop exactly at the inner vertical uprights 21 and 22 of each pair of shelves, and in this position the carriages can ascend on the four uprights by means of the four toothed wheels 31.

Figure 8:
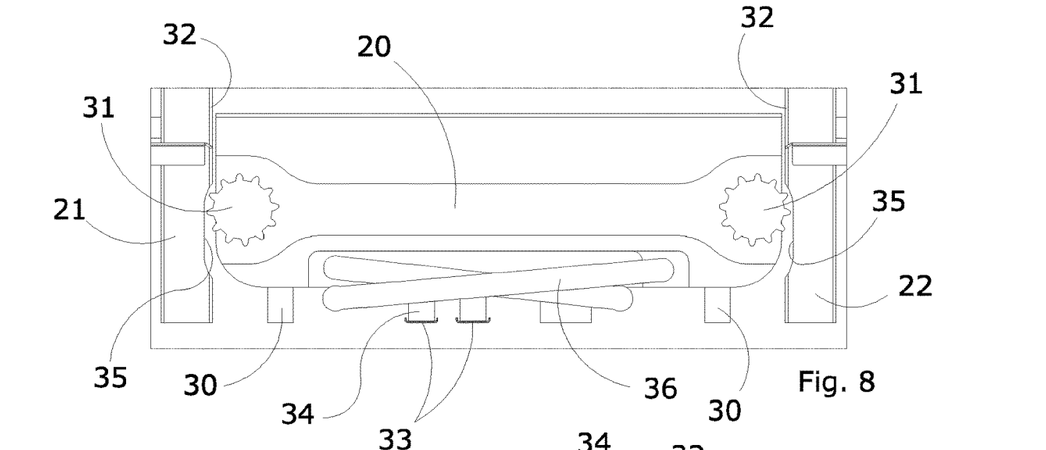
FIGS. 8 to 10 illustrate schematic views of the carriage in three different operating conditions with respect to the uprights with which it is associated.
Figure 9:
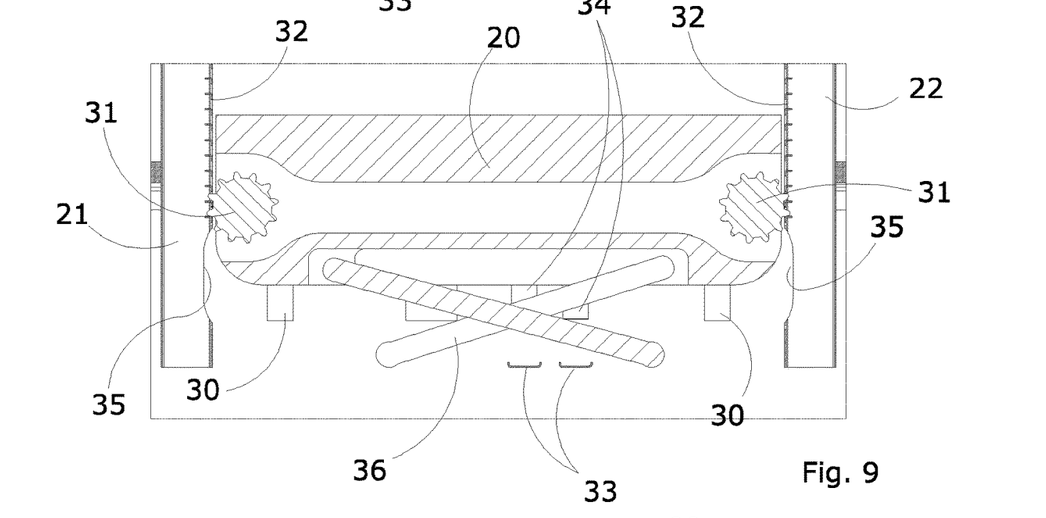
Figure 10:
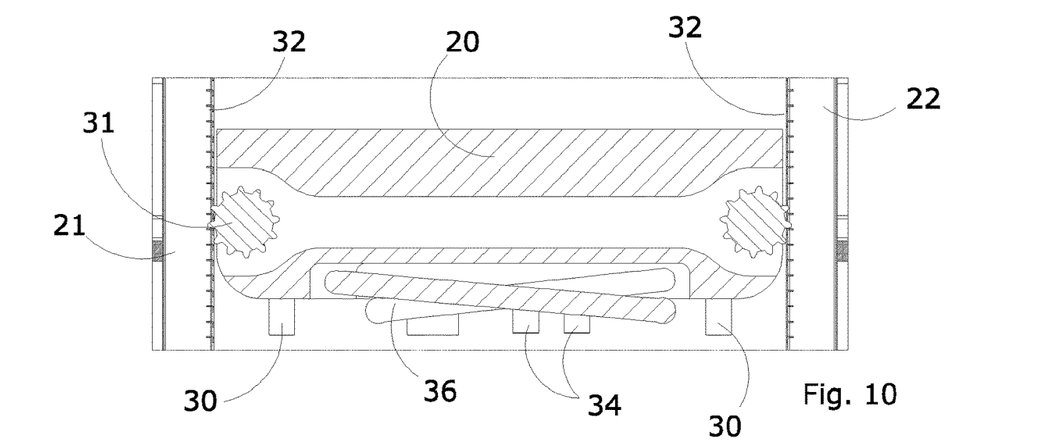

According to a particularly advantageous embodiment of the invention, the method of engaging the wheels 31 with the cuts or recesses 32 within the uprights 21 and 22 is depicted in FIGS. 8, 9 and 10.

According to this solution, the cuts or recesses 32 for movement are positioned so as not to interfere with the sliding wheels 30 when the carriage 20 is on the ground.

In practice, at the lower portion thereof, the uprights 21 and 22 have a recess 35 which allows the carriage 20 equipped with toothed wheels 31, which project for a certain portion from the two opposite edges thereof, to pass through the modules during the sliding on the ground.

According to the invention, it is provided that for the engagement of the toothed wheels 31 on the cuts or recesses 32, the carriage is equipped with a lifting device of the pantograph type 36, for example of the cross lever type, which is activated by motor organs, which are known and not depicted, located inside the carriage 20.

The pantograph-type device 36 which, in the rest position allows the translation of the carriage on the ground (FIG. 8), pushing the levers towards the ground causes the carriage 20 to ascend, to allow the toothed wheels 31 to mesh with the constant-pitch recesses 32 positioned slightly higher (FIG. 9).

Once meshed, the toothed wheels can be activated to allow the ascent of the carriage on the uprights 21 and 22 (FIG. 10).

According to a further embodiment, the pantograph system is replaceable by equivalent lifting means, such as vertical axis pistons or other similar actuators suitable for the same purpose.

The supply of electricity, in the case of electric motors for longitudinal movements on the ground, for motorising the toothed wheels 31 and the movement of the pantograph 36, takes place through accumulators located inside the carriages 20.

According to the embodiment shown in FIGS. 1, 3, 8, 9 and 10, the energy for charging said batteries is supplied by means of an electrical connection represented by an electrical line 33, positioned on the ground along the central aisle of circulation 25, which provides energy collected via shoes 34 projecting from the lower part of the carriage 20 at the moment when it is at the lowest height, i.e., with the wheels 30 placed on the ground.

It is also provided that this electrical socket system is also or only positioned in specific charging zones.

From what has been described above, it is possible to highlight some advantages offered by the solution according to the invention, the main one being represented by a clear reduction of the fixed systems related to the movement systems along longitudinal and vertical axes and by a simplification of the mechanisms which allow the movement of the carriage, especially for the absence of kinematic mechanisms of the toothed wheels 31, which are no longer necessary to engage the recesses 32, since such wheels are placed on fixed axles.

Furthermore, and more generally, in the vertical farm environment, but also in that of logistics warehouses, many opposite static racks can be installed with the features described and along longitudinal ridges on the ground, none with a dedicated kinematic mechanism. The carriages 20 completely replace the longitudinal and vertical movement and picking/depositing systems, with the advantage of being able to move along the ridges of the system.

As a function of service needs, and therefore depending on the cultivation movement needs, it is possible to insert possibly a larger number of carriages to ensure the requested service.

Another advantage is to have independent carriages numerically adaptable to the functions requested in the system and the possibility of being able to serve even in the same rack column with multiple carriages at different heights. While one or more carriages are located at sufficient heights along the vertical axis to allow sufficient space therebelow, other carriages positioned on the ground can travel along the longitudinal axis to carry trays from one rack to another or outside the farm.

Another advantageous aspect is that each carriage 20 is equipped with its own control and command unit and is uniquely identified in the system thanks to traffic algorithms within the modular warehouse, so as to be able to know or determine the service rule.

All this translates into a sharp reduction in the electrical systems and control panels, generally external.

The use of specific guide carriages equipped with sensors and cameras is also envisaged, which can control and make the entire system easier to manage.

The invention has been described in the foregoing with reference to a preferential embodiment thereof. However, it is clear that the invention is susceptible to numerous variants which fall within the scope thereof, and which are technically equivalent.

The invention claimed is:

1. A logistic system for managing and displacing materials located inside a vertical modular structure for industrial use or intended for hydroponic cultivation or other similar cultivations, said structure comprising:
   a) a first series of shelves next to each other and a second series of shelves next to each other, the first series of shelves v being arranged in front of the second series of shelves, a central aisle of circulation being obtained between the first series of shelves and the second series of shelves, each of the shelves being made up of a first pair of uprights facing towards the central aisle and a second pair of uprights facing towards the opposite side, the uprights of each shelf being retained by structural cross members to form a quadrilateral arrangement;
   b) a series of rests or racks arranged towards the inside of the first pair of uprights and connected to the second pair of uprights, so as to be able to constitute opposite rests to support a plurality of trays, containing articles or products subject to being extracted/inserted for the management or movement thereof;
   c) at least one carriage equipped with a movement system with wheels or belts projecting from an upper side thereof, for picking up and/or repositioning said trays from/towards at least one of the series of rests or racks and also to move them among different shelves, and of ground horizontal displacement elements for moving the carriage on the central aisle of circulation;

wherein each of the uprights is provided with cuts or recesses at a constant pitch forming racks arranged on the sides facing outside the shelves which face towards the central aisle of circulation and wherein the carriage comprises a motor with toothed wheels, rotating on a fixed axis, cooperating with two pairs of uprights forming the racks, each upright being fixed to two opposite modular shelves so as to enable the carriage to rise and descend in order to move, from the level of the trays to be moved, to the level of translation on the ground or vice versa, whereby at the lower portion thereof, each one of the uprights has a recess which enables the carriage equipped with toothed wheels which project for a certain portion of the two opposite edges thereof, to pass between the first and the second series of shelves during the sliding on the ground and whereby in order for the toothed wheels to engage on the racks the carriage is provided with a lifting system, activated by motor organs located inside the carriage.

2. The logistic system of claim 1, wherein the toothed wheels rotate on fixed rotation axes that are substantially perpendicular to the axes of sliding wheels and parallel to the advancement direction on the ground.

3. The logistic system of claim 1, wherein a pitch of the cuts or recesses of the racks of the uprights corresponds to a pitch of the teeth of the toothed wheels.

4. The logistic system of claim 2, wherein in order to allow the movement of the carriages in a longitudinal direction when sliding on the ground along the central aisle, the cuts or recesses of the racks are positioned in such a way so as not to interfere with the sliding wheels that are arranged on a fixed axis of rotation and project from the carriage on which they are applied.

5. The logistic system of claim 1, further comprising a device of the pantograph type, comprising levers which are pushed towards the ground, raising the carriage, and enabling the toothed wheels to mesh, with the activation thereof, with the racks which are positioned higher than the ground.

6. The logistic system of claim 5, wherein, once meshed on the racks, the toothed wheels are operated through a rotation element in order to enable an ascent of the carriage on respective uprights.

7. The logistic system according to claim 1, wherein the lifting system is activated by pistons or actuators or by motorisation.

8. The logistic system of claim 2, wherein both the sliding wheels for the displacement of the carriage on the ground, and the toothed wheels for the ascent/descent of the carriage on the uprights, are connected to respective motors.

9. The logistic system of claim 5, wherein energy, in the case of electrical motorisations for the movements in the longitudinal direction on the ground, for the motorisation of the toothed wheels and the movement of the pantograph lifting system, is supplied by batteries located inside the carriages.

10. The logistic system of claim 9, wherein energy for recharging the batteries is supplied by means of an electrical connection represented by an electrical line, positioned on the ground along the central aisle of circulation, which supplies energy collected via shoes projecting from a lower part of the carriage when it is at the lowest height, with the toothed wheels placed on the ground.

11. The logistic system according to claim 1, wherein the sliding of the carriage on the ground is guided within rails or guides located on the ground along a horizontal translation line of the carriage, associated to relative auxiliary shoes or wheels mounted on a lower part thereof.

* * * * *